UNITED STATES PATENT OFFICE.

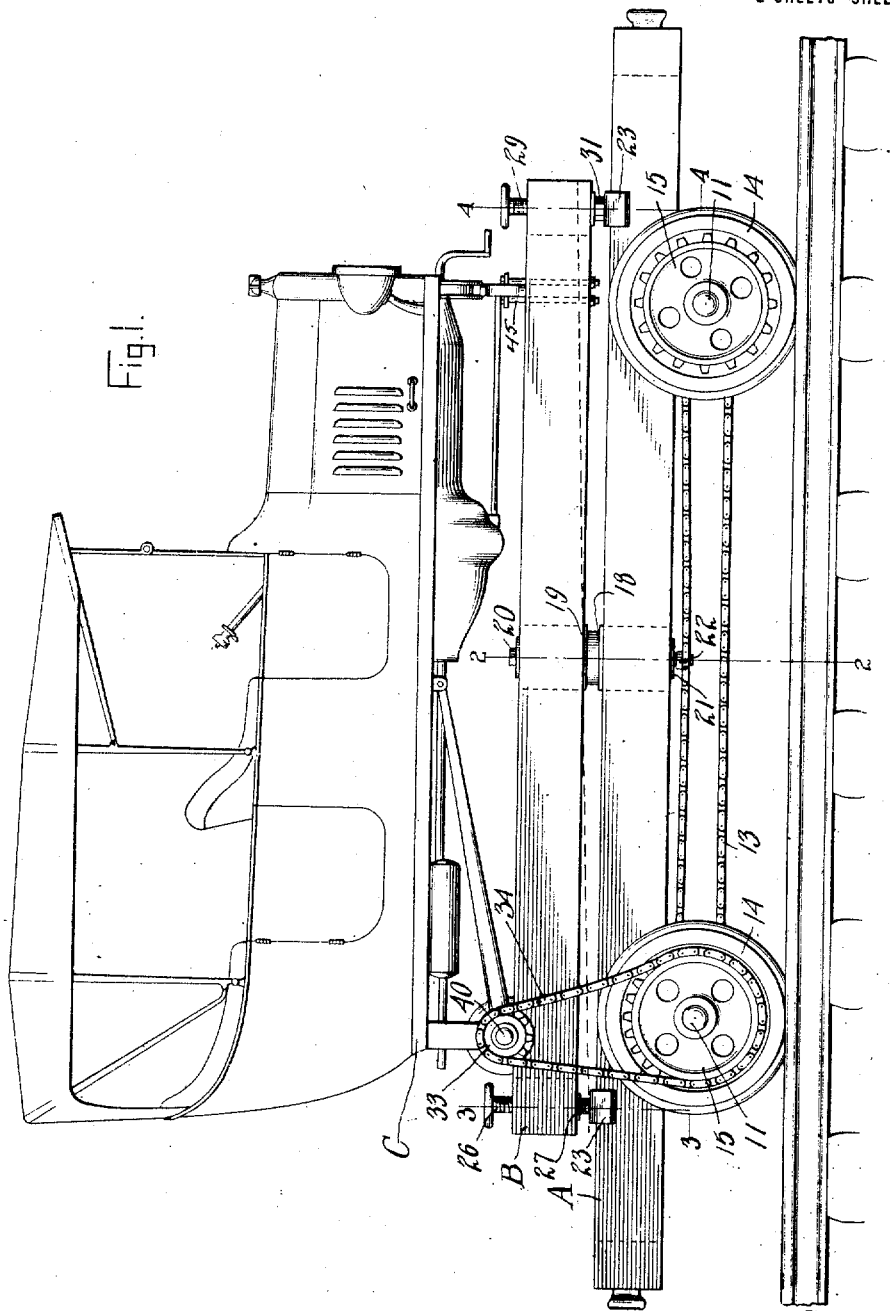

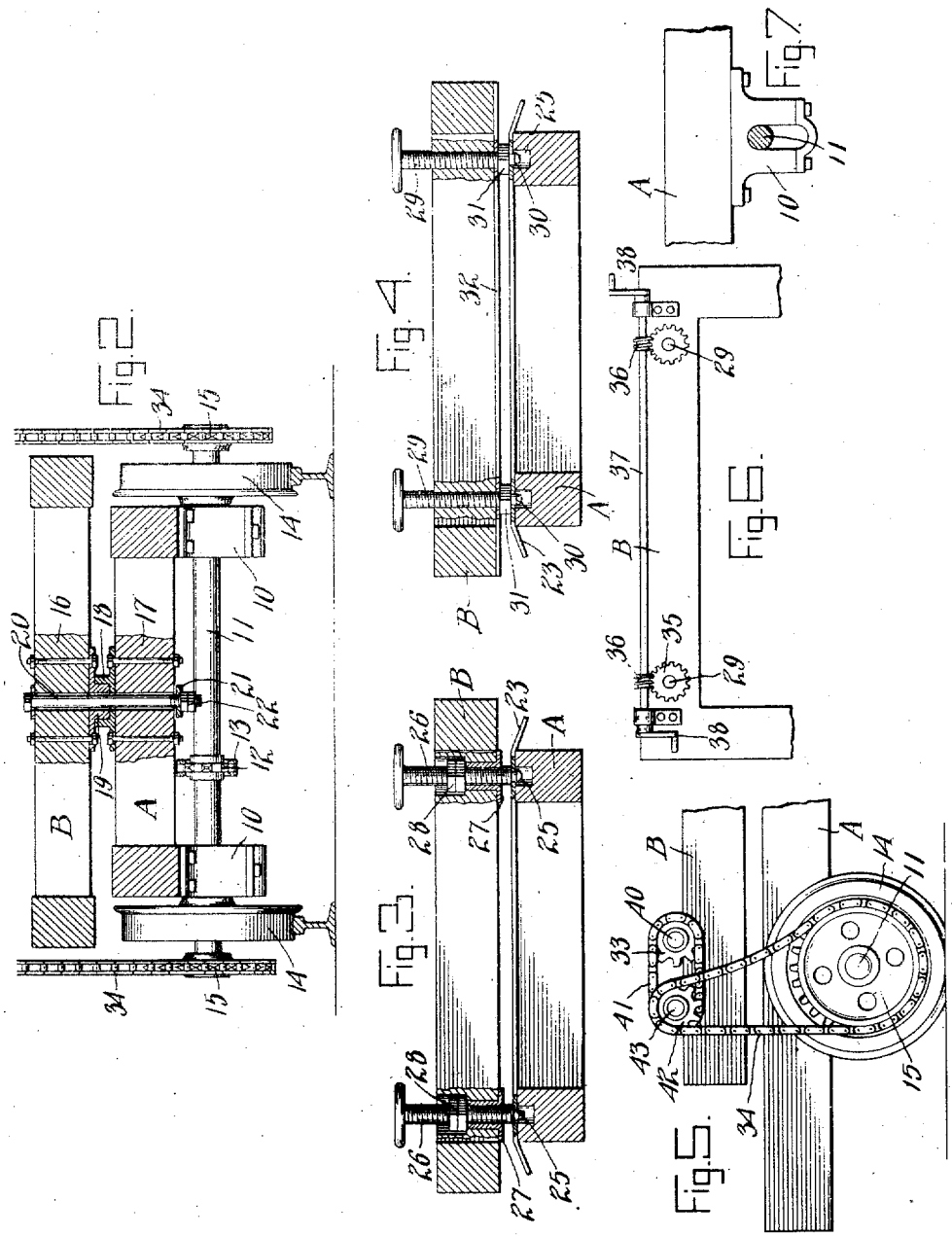

LEMUEL ROSCOE FOREMAN, OF ELIZABETH CITY, NORTH CAROLINA.

TRACTOR.

1,258,329.   Specification of Letters Patent.   Patented Mar. 5, 1918.

Application filed April 7, 1917. Serial No. 160,553.

*To all whom it may concern:*

Be it known that I, LEMUEL ROSCOE FOREMAN, a citizen of the United States, residing at Elizabeth City, Pasquotank county, and State of North Carolina, have invented and discovered certain new and useful Improvements in Tractors, of which the following is a specification.

The purpose of my said invention is to utilize the power of an automobile or motor of any ordinary construction for drawing cars on railway tracks, and to provide means for such utilization of power that will be comparatively simple and inexpensive, and that will be convenient to use.

The immediate purpose of the invention is to utilize such power for the purpose of drawing a train of flat cars over a track, such as used in logging camps, for hauling logs from such camp to the saw mill, and this has been the use to which I have applied my invention, and for which I have found it of peculiar advantage. It will be understood, however, that while my first purpose was to provide a means for performing the work referred to, yet that the invention is adapted for many other uses and that its scope embraces all uses for which it may be found adapted, many of which, other than the one specifically referred to, will readily suggest themselves to those familiar with the art.

The invention further proposes to construct a tractor of the general type referred to, wherein the motor of the automobile will be capable of developing its maximum efficiency for drawing loads, and to this end it is proposed to connect the axles of the truck by suitable gearing whereby the traction of the entire set of wheels may be utilized.

A further purpose of the invention is to provide a tractor of such a type wherein the "forward" gears may be used in going in either direction, and the forward end of the automobile be positioned in whichever direction it is desired to go, thereby bringing the headlights into position for use in whichever direction the train may be operated, and the radiator on the front to meet the air as it moves forward, thus enabling the cooling effect of the air to be utilized to its full extent, irrespective of the direction in which the train is traveling; and, further, to enable the operator to face the direction of travel at all times.

Besides these, other objects and advantages of the invention will suggest themselves to those skilled in the art.

Referring to the accompanying drawings, which are made a part hereof, and on which similar reference characters indicate similar parts, Figure 1 is a side elevation of a tractor constructed in accordance with my said invention, Fig. 2 a cross section through the truck and turn table as on the dotted line 2—2 in Fig. 1, Fig. 3 a cross section on the dotted line 3—3 in Fig. 1, Fig. 4 a cross section on the dotted line 4—4 in Fig. 1, Fig. 5 a view illustrating a modification in the construction of the gear, Fig. 6 a view illustrating another modification, and Fig. 7 a detailed view illustrating the particular construction of box in which the axles are mounted.

In said drawings, the portions marked A represent the frame-work of the truck, B the frame-work of the turn-table mounted thereon, and C the chassis of an automobile.

The truck is composed of the frame A consisting of suitable sills and cross timbers appropriately framed together. Boxes 10 for the axles 11 are bolted to the under side of the sills at appropriate points. Said axles 11 are provided with sprocket wheels 12 connected by a driving chain 13, whereby both axles are geared together. The wheels 14 are ordinary car wheels adapted to run on railroad tracks, as shown. On the outer end of each axle is mounted a sprocket wheel 15.

The turn table likewise consists of a suitable frame-work B composed of sills and cross timbers appropriately framed together. Its construction embraces a central cross timber 16 which is immediately above a central cross timber 17 of the truck frame A. Said timber 17 has bolted to its top a turn-table plate 18 having an annular flange, and the timber 16 has bolted to its under face a plate 19 having a central boss adapted to fit within said annular flange. These parts constitute the means by which the turn-table B is adapted to turn upon the frame A. A bolt 20 extends through a central perforation from the top of cross timber 16 to the under side of cross timber 17, and through the plates 18 and 19 between said cross timbers. The perforation through which said bolt extends is somewhat larger than the bolt, leaving a clearance surrounding the said bolt. A slight clearance is also left between a washer 21 on the lower end of said bolt, held in position by jamnuts 22, and the under side of timber 17. Said bolt 20 thus serves to hold the parts together and prevent the possibility of turn-table B from tilting out of engagement with the frame A, while at the same time establishing a connection of a loose character to permit such tilting as may be necessary for the purposes of the invention.

A metal strip 23, with down-turned outer ends, is mounted across the top of frame A at a point which will be immediately beneath the end cross timbers of the turn-table B. The down-turned ends extend outside of said sills, as shown most clearly in Figs. 3 and 4. Sockets 25 are formed in said sills immediately beneath said metal plates, and perforations in said metal plates register with said sockets. Hand screws 26 are mounted in nut-parts 27 set into sockets in the back cross timber of turn-table B in position to register with the sockets 25. The lower ends of said hand screws are formed tapered and immediately above the tapered points with straight portions adapted to fit within the perforations in the cross plates 23. Shoulders are formed between the screw-threaded portion and the parts engaging in said perforations. Jam-nuts 28 on said screws 26 serve to limit the inward movement thereof. At the front end of the turn table B other hand screws 29 are mounted, which are intended to be fixed in position, the projection of their lower points 30 being determined by nuts 31, which are screwed thereon, and bear against metal plates 32 extending across the under side of the front cross timber of the turn-table.

The automobile C is divested of its wheels and mounted on the top of the turn-table B, being secured thereon by fastening devices 45 extending over the axles and through the timbers of the turn-table, as indicated in Fig. 1. Sprocket wheels 33 are mounted on the ends of the driving axle and these wheels are connected by sprocket chains 34 to the sprocket wheel 15 on one of the axles of the truck. The turn-table B is adapted to tilt on its central support and by this tilting means the chains 34 are readily tightened or slackened. This tilting is accomplished by means of the hand screws 26 which are positioned in that end of the turn-table adjacent to the driving axle of the automobile and may be used to lift said end until the chains 34 are adjusted as desired. The lifting of the end of the turn-table carrying the driving axle tilts down the forward end and in tilting said forward end down, the points of screws 29 are brought to engage the perforations in adjacent plate 23 and the sockets beneath, thus locking said turn-table at each of the four corners of the structure against any tendency to turn in either direction.

In Fig. 6 I have shown pinions 35 on the upper end of the screws 29 and these connected by worms 36 to a cross shaft 37 having cranks 38 by which both screws may be turned and adjusted simultaneously.

In Fig. 5 I have illustrated another modification, which may be found desirable in cases where the automobile axle is longer or shorter than the width of the truck. In such a case the automobile axle 40, with its pinion 33, would be connected by a sprocket chain 41 to a similar sprocket wheel (not shown) on a countershaft 43, and the sprocket chain 34 would run from the sprocket wheel 15 of the axle 11 to the sprocket wheel 42 on the countershaft 43.

In running over a track such as is used in logging camps and for similar purposes where the track is very uneven, a provision must be made for a movement between the rigid truck frame A and the wheels, in order that the wheels may at all times remain on the track for traction purposes. To accomplish this result I provide the slotted box 10 and mount the axle 11 loosely therein, as shown in Fig. 7, and this I have found by actual use to be satisfactory for the purpose. For some purposes a more expensive construction may be desired and a sliding box of a suitable type provided, as will be readily understood.

In operation, the tractor being geared up, as illustrated in Fig. 1, a train of cars may be attached by ordinary railway coupling devices and the automobile motor started in the usual way and the power applied through the driving axle 40, and the gearing described to the traction wheels of the truck. The pulling capacity of the motor has been found sufficient so that this comparatively cheap construction of truck has been used to do work for which specially constructed motors of far greater cost have been found inadequate. In practice I have used an ordinary Ford automobile and handled six cars loaded with logs very readily and conveniently. When it is desired to reverse the direction of the train it may be done by merely backing the screws 26, tilting the turn-table until the rear end rests upon the metal plates 23, which serves to withdraw the points of screws 29 from their engagement with the sockets in the other end of the frame and, at the same time, to slacken the sprocket chains so that they may be readily freed from the sprocket wheels 15, and permit the car to be swung upon its turn-table to face in the opposite direction, and chains 34 are engaged with the sprocket wheel 15 on the axle at the other end of frame A. The points of screws 26 are also brought into engagement with the sockets in the bar 23 at the other end, said screws turned down to lift up the rear end of the turn-table, tighten the driving chain, and engage the other locking screws 29. All of this requires less than one minute, and then the tractor is ready to drive the train in the opposite direction, thus enabling the "go-ahead" gears to be doing the work regardless of which direction the train is to be moved, and with the other advantages first above referred to. The reverse can be used for backing for short distances and ordinary brake mechanism (not shown) operated by the usual foot lever used for braking. It is obvious that those skilled in the art may vary the details of construction and arrangement of parts without departing from the spirit of my invention, and therefore I do not wish to be limited in the scope of my invention except as may be required by the claims.

Having thus fully described my said invention, what I claim as new and desire to secure by Letters Patent, is:—

1. In a tractor, the combination of a wheeled truck, a turn-table mounted on the truck, an automobile having the wheels thereof removed mounted on said turn-table, and a direct driving connection between the driving axle of the automobile and said truck, substantially as set forth.

2. In a tractor, the combination of a wheeled railroad truck, a turntable mounted on the truck, a positive driving connection between the axles of the truck, an automobile having the wheels removed mounted on the turn-table of the truck, and a driving connection between the automobile driving axle and the wheels of the truck, substantially as set forth.

3. In a tractor, the combination of a wheeled railroad truck, a driving connection between the wheels of the truck, a turn-table mounted on the truck, an automobile mounted on said turn-table, and a driving connection between the automobile drive shaft and the wheels of the truck, substantially as set forth.

4. In a tractor, the combination of a wheeled railroad truck, a driving connection between the wheels of the truck, a turn-table mounted on the truck, an automobile having the wheels of the driving axle thereof removed mounted on said turn-table, and a driving connection between the automobile driving axle and the wheels of the truck, substantially as set forth.

5. In a tractor, the combination of a wheeled railroad truck, a driving connection between the wheels of the truck, a turn-table mounted on the truck, an automobile having the wheels of the driving axle thereof removed mounted on said turn-table, and a chain and sprocket driving connection between the automobile driving axle and the wheels of the truck, substantially as set forth.

6. In a tractor, the combination of a wheeled railroad truck, a chain and sprocket driving connection between wheels on said truck, a turn-table mounted on the truck, an automobile mounted on said turn-table, and a chain and sprocket driving connection between the automobile driving axle and the wheels of the truck, substantially as set forth.

7. In a tractor, the combination of a wheeled railroad truck, sprocket wheels secured to said truck wheels respectively, an automobile mounted on the truck, and a chain drive from said automobile driving axle adapted to engage with the sprockets of either the front or rear truck wheels, substantially as set forth.

8. In a tractor, the combination of a wheeled truck, a frame revolubly mounted on the truck, devices on the respective corners of the frame for engaging the truck to hold said frame against turning, an automobile having the wheels removed mounted on the frame, and a driving connection between the automobile and the wheels of the truck, substantially as set forth.

9. In a tractor, the combination of a wheeled truck, a frame mounted on the truck, an automobile having the wheels removed mounted on the frame, a chain driving gear between the automobile and the truck, and means for tilting said frame to apply and adjust said chain, substantially as set forth.

10. In a tractor, the combination of a wheeled truck, a frame revolubly mounted on the truck, an automobile having the wheels removed mounted on the frame, a chain driving gear between the automobile and the truck, and means for tilting said frame to apply and adjust said chain, substantially as set forth.

11. In a tractor, the combination of a wheeled truck, a frame revolubly mounted on the truck, devices on the respective corners of the frame for engaging the truck to hold said frame against turning, an automobile having the wheels removed mounted on the frame, a chain driving gear between the automobile and the truck, and said frame adapted to be tilted by said corner devices to apply and adjust said chain, substantially as set forth.

12. In a tractor, the combination of a wheeled truck, a frame revolubly mounted on the truck, screws on the respective corners of the frame adapted to engage said truck and hold the frame against turning, an automobile having the wheels thereof removed mounted on the truck, and a driving connection between the automobile and the wheels of the truck, substantially as set forth.

13. In a tractor, the combination of a wheeled truck, a frame revolubly mounted on the truck, a pair of apertured strips mounted on said truck, screws on the respective corners of the frame adapted to engage in the apertures of said strips and hold the frame against turning, an automobile having the wheels thereof removed mounted on the truck, and a driving connection between the automobile and the wheels of the truck, substantially as set forth.

14. A tractor comprising a wheeled railroad truck, an automobile mounted on said truck, gearing connecting the driving axle of the automobile with the driving axle of the truck, and means for coupling said driving gear to drive the tractor in either direction by the direct, or forward, driving gear of the automobile, substantially as set forth.

15. A tractor comprising a wheeled railroad truck, an automobile mounted on said truck, driving gear for connecting the driving axle of the automobile with the driving axle of the truck, and means for shifting the driving connection of said gear, whereby the forward driving gearing of the automobile may be utilized to drive the truck in either direction, substantially as set forth.

In witness whereof, I have hereunto set my hand and seal at Washington, District of Columbia, this seventh day of March, A. D. nineteen hundred and seventeen.

LEMUEL ROSCOE FOREMAN. [L. S.]

Witness:
   E. W. BRADFORD.